May 23, 1950     J. MERCIER     2,508,763

COMPRESSION COUPLING

Filed Nov. 23, 1945

INVENTOR
*Jacques Mercier*
BY
*Dean Fairbank & Hirsch*
ATTORNEYS

Patented May 23, 1950

2,508,763

UNITED STATES PATENT OFFICE 2,508,763

COMPRESSION COUPLING

Jacques Mercier, New York, N. Y.

Application November 23, 1945, Serial No. 630,269

11 Claims. (Cl. 285—122)

It is among the objects of the invention to provide a pipe coupling of rugged construction, which may be applied without the exercise of particular skill, and indeed is substantially foolproof in that it does not admit of incorrect application by an unskilled person, the constituent parts of which may be produced at a minimum of expense with a minimum of machining operations and which yet affords an unusually secure and effective bond between the parts, and admits of ready separation for opening of the coupling and reapplication thereof with substantial assurance of a joint as tight as that originally prepared.

Figure 1:
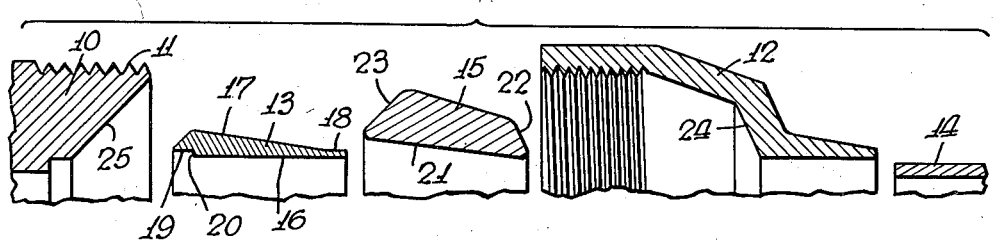
Figure 2:
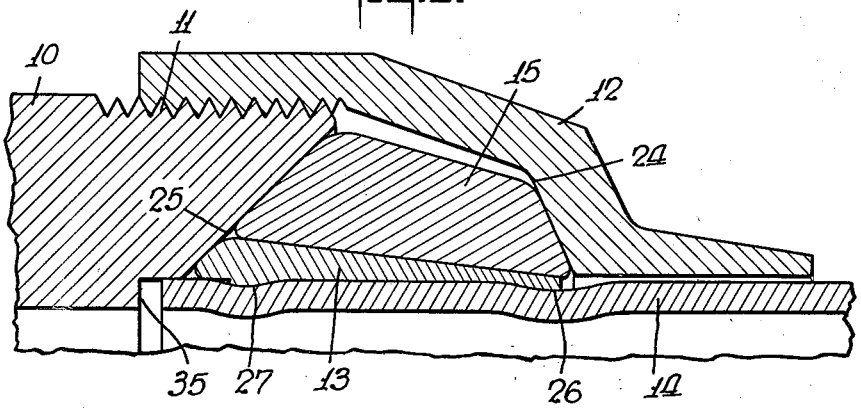
Figure 3:
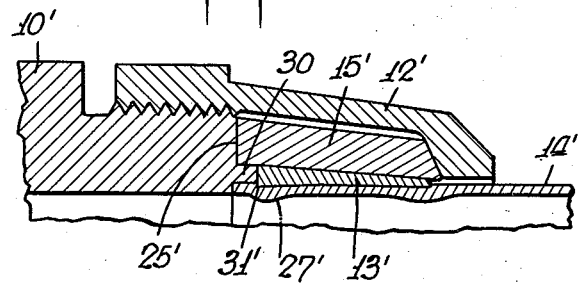
Figure 4:
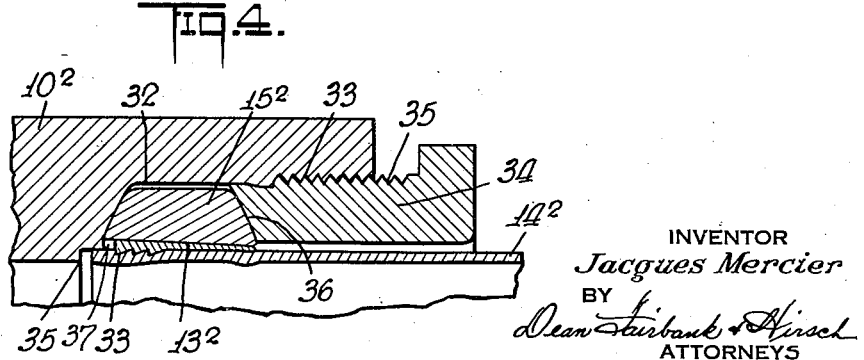

In the accompanying drawings in which are shown one or more of various possible embodiments of the features of the invention, Fig. 1 is an exploded view of the constituent elements making up one embodiment of the coupling, Fig. 2 is a view in longitudinal cross section showing the assembled coupling, Fig. 3 is a view similar to Fig. 2, showing a modification thereof, and Fig. 4 is a view similar to Figs. 2 and 3 of a further modification.

Referring now to the drawings, the coupling includes a threaded fitting member, a threaded clamping member and a wedging instrumentality interposed therebetween to grip the tube end encompassed thereby.

In Figs. 1 and 2, the threaded fitting 10 is a pipe nipple, externally threaded at 11 and the clamping member is a threaded sleeve 12. The tube wedging instrumentality therebetween comprises an inner tube gripping sleeve 13 snugly to embrace the tube 14 to be coupled, and an outer coacting wedge tightening sleeve 15.

According to the invention, the inner or tube gripping sleeve 13 is generally frusto-conical in shape and provided with a generally cylindrical bore or inner wall 16. The outer or generally frusto-conical wall 17 is preferably made more nearly if not quite cylindrical at its narrow end 18. If desired, said sleeve may flare somewhat near its thicker end but preferably the said wedge sleeve has a peripheral groove 19 at the inner wall of its outer or thicker end, presenting a peripheral shoulder 20 with a relatively sharp peripheral edge.

The outer or wedge tightening sleeve 15 desirably has a frusto-conical bore 21, extending along generally the same angle as the main length of the outer wall of the tube gripping sleeve 13, which it is to engage. The said wedge tightening sleeve preferably flares outward as shown, and desirably is beveled from its inner to its outer wall, both as at 22 at the outer end and at 23 at the inner end.

In a preferred embodiment, the inner or tube gripping sleeve 13 is of hardness somewhat greater than that of the tube 14 to be wedged thereby, while the outer or wedge tightening sleeve 15 is of metal harder than the tube gripping sleeve 13. As shown, the threaded clamping sleeve 12 has an inner abutment wall 24 which is frusto-conical to conform to the corresponding shape of the outer or wedge tightening sleeve 15.

After the wedging sleeves are passed over tube 14, to be clamped and introduced into the end of the pipe fitting 10, the threaded clamping sleeve 12 (previously passed over the end of tube 14) is then tightened upon the fitting 10. The threaded clamping sleeve 12 in reacting against the end 22 of the wedge tightening sleeve 15 forces the latter inward to distort the inner or softer tube gripping sleeve 13 as shown, to conform at its outer surface to the substantially precise frusto-conical shape of the bore of sleeve 15, but said threaded clamping sleeve 12 does not engage the inner or tube gripping sleeve 13; the latter being confined entirely in the generally frusto-conical space between the tube 14, the outer or wedge tightening sleeve 15 and the frusto-conical wall 25 in the pipe fitting 10. The tube gripping sleeve 13 will thus be forced inward about the tube 14 near its thinner extremity to form a groove in pipe 14 as at 26. The peripheral shoulder 20 will likewise be forced inward and will be deformed to a rounded rib pressing inward to conform to a peripheral groove 27 thereby pressed into the tube 14. Thus there is accomplished great security of bond of the gripping sleeve 13 about the tube 14.

As shown, the wedge sleeves 13 and 15 engage each other along an area of contact which is substantially equal to that of the entire outer face of the tube gripping sleeve 13, so that the engagement therebetween is especially secure and the clamping effect upon the tube is particularly effective.

In the preferred embodiment, the angle of contact between the two wedge sleeves does not exceed, and is preferably somewhat less than the critical angle of friction therebetween, which ordinarily is in the order of three degrees, though shown somewhat exaggerated in the drawings. By this arrangement, the two wedge sleeves become substantially inseparably bonded to each other, once the coupling is tightened and the inner sleeve 13 becomes inseparably bonded to the tube 14 by reason of the indentation of the latter at 26 and 27 inherently incurred as above set forth.

The coupling may readily be opened by unthreading the clamping sleeve 12 and removing the tube 14 from the fitting 10, but the wedge sleeves 13 and 15 remain firmly bonded to the tube 14 and to each other. In other words, the attempt to remove or separate such wedge sleeves from the tube 14 would entail injury to one, two or all three of the bonded pieces. The pipe coupling may, therefore, readily be retightened without the danger of slippage incurred with the use of conventional pipe couplings.

If it were carelessly attempted to apply sleeve 15 in reverse position, the same would prevent the threads on the threaded clamping sleeve 12 from reaching those on the fitting 10.

The embodiment of Fig. 3 is generally similar to that of Figs. 1 and 2 except that the tube gripping sleeve 13' lacks the conformation 19–20 of Figs. 1 and 2 and abuts at its inner end directly against a peripheral ridge 30 protruding outward from the square end 25' of the pipe fitting 10'. The wedge tightening sleeve 15' is generally similar to that of Figs. 1 and 2, though shaped with a square end to abut the end of the fitting 10'. It will accordingly be seen that when the clamping sleeve 12' is tightened, the wedge tightening sleeve will cause the tube gripping sleeve to become wedged against the protruding ridge 30 and thereby to cause its inner edge 31' to bite into the tube 14' and to indent it, as shown at 27'.

The embodiment of Fig. 4 shows the application of the invention to a different type of coupling in which the pipe fitting $10^2$ is provided with a socket 32 tapped at its outer end as at 33. The tube gripping sleeve $13^2$ may be similar to that of Figs. 1 and 2 and its inner end preferably about the floor of socket 32 as shown. Sleeve $13^2$ is illustratively shown with internal ridges 33 and the wedge tightening sleeve $15^2$ is generally similar to that of the other embodiment. The coupling is tightened by a plug 34 encompassing the tube $14^2$ externally threaded as at 35 and having a concavity 36 at its inner end conforming to the bevel of the wedge tightening sleeve $15^2$. Accordingly when the plug is tightened in place, the wedging or tightening occurs in manner similar to the other embodiments, the ridges 33 biting into the pipe $14^2$.

In each of the embodiments of Figs. 1, 2 and 4, the bore of the pipe fitting 10, 10', $10^2$, is desirably enlarged as at 35 to accommodate the inner extremity of the pipe 14, 14', $14^2$, which protrudes beyond the tube gripping sleeve 13, 13', $13^2$.

Where the tube is of outer diameter, of one (½) half inch or more, adequate tightening may be accomplished by the use of the same small wrench resorted to in tightening the clamping sleeves 12 or the plug 34 as the case may be, of small pipe couplings. In such larger couplings the inner end of the tube gripping sleeve need merely be slotted as at 37 to facilitate the deformation under tightening pressure.

The two wedge pieces in each embodiment may each be readily formed as by forging, without the need for machining as required by the conventional flanged constructions. By the arrangement set forth, the length and periphery of the tube gripping sleeve is subjected to the wedging action so that there is an increased efficacy of hold as compared with constructions of which only a portion of the effective area is available for clamping.

As many changes could be made in the above construction, and many apparently widely different embodiments of this invention could be made without departing from the scope of the claims, it is intended that all matter contained in the above description or shown in the accompanying drawings, shall be interpreted as illustrative and not in a limiting sense.

Having thus described my invention, what I claim as new and desire to secure by Letters Patent of the United States is:

1. A compression coupling, comprising a threaded fitting member, a threaded clamping member coacting therewith, and a pair of telescoped wedge sleeves interposed between said members and encompassing the tube to be coupled, the inner of said wedge sleeves being a tube gripping sleeve, the outer of said sleeves being a wedge tightening sleeve, each of said sleeves being thickest at its outer end and thinnest at its inner end, the wedge tightening sleeve having an inner frusto-conical bore to which the outer wall of the inner sleeve conforms in the tightened coupling.

2. A compression coupling, comprising a threaded fitting member, a threaded clamping member coacting therewith, and a pair of telescoped wedge sleeves interposed therebetween and encompassing the tube to be coupled, the inner of said wedge sleeves being a tube gripping sleeve, the outer of said sleeves being a wedge tightening sleeve, each of said sleeves being thickest at its outer end and thinnest at its inner end, the wedge tightening sleeve having a frusto-conical bore to which the outer wall of the tube gripping sleeve conforms in the tightened coupling, the inner wall of the tube gripping sleeve being generally cylindrical and the outer wall thereof being frusto-conical with reduced angle near its inner end, whereby in the tightened unit the tube gripping sleeve will depress the wall of the tube being clamped near an end of said tube gripping sleeve.

3. A compression coupling, comprising a threaded fitting member, a threaded clamping member coacting therewith, a pair of telescoped wedge sleeves interposed therebetween, including an inner tube gripping sleeve and an outer wedge tightening sleeve, said sleeves being thicker at their outer end than at their inner end, the two wedge sleeves having a coacting frusto-conical surface extending the entire outer area of the tube gripping sleeve, the inner ends of said wedge sleeves both directly engaging the fitting member, the wedge tightening sleeve being of length such that if introduced in reversed relation it precludes application of the threaded clamping member to the fitting member, the angle of contact between the two wedging sleeves being no greater than the critical angle of friction between said sleeves.

4. A compression coupling, comprising a threaded pipe fitting member, a threaded clamping member coacting therewith, and a pair of wedge sleeves interposed therebetween, each of said sleeves increasing relatively uniformly in thickness from its inner to its outer extremity, the inner wedge sleeve being a tube gripping sleeve of hardness greater than of the tube to be gripped thereby, the outer or wedge tightening sleeve being of hardness greater than the inner of said sleeves.

5. A compression coupling, comprising a threaded pipe fitting member, a threaded clamping member coacting therewith, and a pair of wedge sleeves interposed therebetween, each of said sleeves increasing relatively uniformly in thickness being thicker at their outer extremity than at their inner extremity, the inner wedge sleeve being a tube gripping sleeve of hardness greater than that of the tube to be gripped thereby, the outer or wedge tightening sleeve being of hardness greater than the inner of said sleeves, the threaded clamping sleeve directly engaging the outer extremity of the wedge tightening sleeve, the tube gripping sleeve being clamped between the tube to be tightened and said wedge tightening sleeve and being free from contact with the threaded clamping member.

6. The combination recited in claim 5, in which the tube clamping sleeve has a peripheral notch at the wider end of its bore for effective biting into the tube when the coupling is tightened.

7. The combination recited in claim 5, in which the threaded fitting member has a peripheral narrow outwardly projecting ridge engaged by the extremity of the tube wedging sleeve and effective to wedge the inner edge at the wider end of said sleeve inward to grip the tube when the wedge tightening sleeve is tightened thereon.

8. A pipe coupling, comprising a threaded nipple fitting, a threaded sleeve coacting therewith, a pair of telescoped wedge sleeves interposed therebetween, the inner of said sleeves being the tube gripping sleeve, the said sleeves having a frusto-conical area of engagement therebetween extending substantially over the entire outer area of the inner sleeve, the angle of contact between the said two sleeves being no greater than the critical angle of friction therebetween, the nipple fitting having a frusto-conical end well engaged by the correspondingly shaped wider ends of the respective wedge sleeves, and the threaded clamping sleeve having an oblique frusto-conical area of contact with the corresponding end of the wedge tightening sleeve but being free from contact with the tube gripping sleeve.

9. A pipe coupling, comprising a tapped pipe fitting having a socket, a plug threaded thereinto, wedging sleeves interposed between said tapped fitting and said plug, said wedging sleeves including a tube gripping sleeve and a wedge tightening sleeve telescoped thereover, the threaded plug having a conical depression at its inner end in engagement with the conical end of the wedge tightening sleeve and free from engagement with the tube wedging sleeve, the inner end of the wedge tightening sleeve having a frusto-conical area of engagement in the bottom of said socket.

10. A pipe coupling, comprising a tapped pipe fitting having a socket, a plug threaded thereinto, a pair of telescoped wedge sleeves interposed between said fitting and said plug, said wedge sleeves including a tube gripping sleeve and a wedge tightening sleeve telescoped thereover, the threaded plug having a conical depression at its inner end in engagement with the conical end of the wedge tightening sleeve and free from engagement with the tube gripping sleeve, the inner end of the wedge tightening sleeve having a frusto-conical area of engagement in the bottom of said socket, the two wedge sleeves having a generally frusto-conical area of engagement therebetween extending over substantially the entire outer surface of the inner or tube gripping sleeve and extending at an angle no greater than the critical angle of friction between said sleeves.

11. A compression coupling, comprising a threaded fitting member to which a tube end is to be coupled, a threaded clamping member to be threaded to said fitting member, and interposed wedging sleeves comprising a tube gripping sleeve generally cylindrical at its inner wall and flaring outwardly from the outer to the inner end of its outer wall, the tube gripping sleeve being slotted at its inner end, and a wedge tightening sleeve telescoped over said gripping sleeve, said tightening sleeve engaging substantially the entire outer face of said gripping sleeve and abutting the threaded fitting member.

JACQUES MERCIER.

REFERENCES CITED

The following references are of record in the file of this patent:

UNITED STATES PATENTS

| Number | Name | Date |
|---|---|---|
| 2,326,929 | Cowles | Aug. 17, 1932 |

FOREIGN PATENTS

| Number | Country | Date |
|---|---|---|
| 268,162 | Great Britain | Mar. 31, 1927 |